(12) United States Patent
Sheldon et al.

(10) Patent No.: US 10,831,039 B2
(45) Date of Patent: Nov. 10, 2020

(54) FLEXIBLE BRIDGE ASSEMBLY FOR RIMLESS EYEWEAR

(71) Applicant: Brent Sheldon, Miami Beach, FL (US)

(72) Inventors: Brent Sheldon, Miami Beach, FL (US); Guy Brousseau, Jr., Marieville (CA)

(73) Assignee: Brent Sheldon, Miami Beach, FL (US)

( * ) Notice: Subject to any disclaimer, the term of this patent is extended or adjusted under 35 U.S.C. 154(b) by 0 days.

(21) Appl. No.: 15/891,510

(22) Filed: Feb. 8, 2018

(65) Prior Publication Data

US 2019/0243158 A1    Aug. 8, 2019

(51) Int. Cl.
| | |
|---|---|
| G02C 5/00 | (2006.01) |
| G02C 5/06 | (2006.01) |
| G02C 1/00 | (2006.01) |
| G02C 1/02 | (2006.01) |
| G02C 5/04 | (2006.01) |

(52) U.S. Cl.
CPC ............... G02C 5/06 (2013.01); G02C 1/02 (2013.01); G02C 1/10 (2013.01); G02C 5/008 (2013.01); G02C 5/04 (2013.01); G02C 2200/16 (2013.01)

(58) Field of Classification Search
CPC ... G02C 1/02; G02C 1/10; G02C 5/06; G02C 1/023; G02C 5/008; G02C 5/04
USPC .......................... 351/110, 129, 131, 126, 132
See application file for complete search history.

(56) References Cited

U.S. PATENT DOCUMENTS

| 2,256,846 A | 9/1941 | Lohmann |
|---|---|---|
| 2,290,389 A | 7/1942 | Slotsky |
| 4,389,758 A * | 6/1983 | Akashi ................. A44B 19/262 24/429 |
| 6,439,717 B2 | 8/2002 | Weber |
| 6,719,425 B2 | 4/2004 | Conner |
| 6,729,725 B1 * | 5/2004 | Cheng ..................... G02C 1/02 351/110 |
| 7,497,570 B2 | 3/2009 | Cohen et al. |
| 8,931,894 B1 | 1/2015 | Chen |
| 9,527,252 B2 | 12/2016 | Sheldon et al. |
| 2006/0250572 A1* | 11/2006 | McNeal ................. G02C 1/023 351/129 |

(Continued)

FOREIGN PATENT DOCUMENTS

| CN | 202837702 | 3/2013 |
|---|---|---|
| WO | 2010086650 A1 | 8/2010 |

OTHER PUBLICATIONS

Stewart, W.; International Search Report from corresponding PCT Application No. PCT/CA2019/050167; search completed Apr. 9, 2019.

*Primary Examiner* — Jordan M Schwartz (57) ABSTRACT

A flexible bridge assembly for eyewear is provided. The assembly includes a body comprising a flexible first mounting portion and a second flexible mounting portion each extending from opposite ends of a flexible central portion. The assembly also includes a first mounting member embedded in the first mounting portion; and a second mounting member embedded in the second mounting portion. The first mounting portion and first mounting member comprise a first passage to enable the flexible bridge assembly to be secured to a first lens of the eyewear, and the second mounting portion and second mounting member comprise a second passage to enable the flexible bridge assembly to be secured to a second lens of the eyewear. Rimless eyewear comprising the flexible bridge assembly is also provided.

23 Claims, 7 Drawing Sheets

(56) References Cited

U.S. PATENT DOCUMENTS

2015/0316784 A1* 11/2015 He .......................... G02C 1/02
351/110

* cited by examiner

FLEXIBLE BRIDGE ASSEMBLY FOR RIMLESS EYEWEAR

TECHNICAL FIELD

The following relates to flexible bridge assemblies for rimless eyeglasses.

BACKGROUND

Eyewear such as eyeglasses generally include a frame that supports one or more lenses. The frame typically includes a nose bridge or nose pieces that engage the user's nose to support the eyewear on the user's head. Eyeglasses also typically include a pair of arms attached to (or integral with) the frame, to further support the eyeglasses, e.g. by resting the arms on the user's ears or engaging their head in the temple region. Other eyewear may include other support elements such as straps or bands (e.g., in sports goggles). These frames can include rims that surround the lenses, or can be connected directly to the lenses in multiple components, providing a "rimless" configuration.

Eyeglasses have traditionally utilized frames or frame components made from substantially rigid materials such as plastics, metals, or composite materials. The rigidity of these materials supports the lenses with the frames, and substantially maintains the shape of the eyeglasses such that they consistently fit on a user's head as intended. A drawback of this rigidity is that the frames can only typically withstand some flexure and can be prone to breakage or deformation.

Flexible components have been used in eyewear, for example, flexible arms and flexible portions of the eyewear frames. Various challenges can arise in construction, assembly, and use when incorporating flexible elements. For example, the flexibility should not cause the frames to deform and thus lose their shape over time. Other challenges include assembly complexities and costs associated with using multiple different materials.

It is an object of the following to address at least one of the above-noted disadvantages.

SUMMARY

In a first aspect, there is provided a flexible bridge assembly for eyewear comprising: a body comprising a flexible first mounting portion and a second flexible mounting portion each extending from opposite ends of a flexible central portion; a first mounting member embedded in the first mounting portion; and a second mounting member embedded in the second mounting portion; wherein the first mounting portion and first mounting member comprise a first passage to enable the flexible bridge assembly to be secured to a first lens of the eyewear, and the second mounting portion and second mounting member comprise a second passage to enable the flexible bridge assembly to be secured to a second lens of the eyewear.

In an implementation, the body is overmolded over the first and second mounting members.

In another aspect, there is provided rimless eyewear comprising: first and second lenses; first and second arm mounting components coupled to a first end of a respective one of the first and second lenses; first and second arms coupled to the first and second arm mounting components; a flexible bridge assembly coupled to the first and second lenses, the flexible bridge assembly comprising: a body comprising a flexible first mounting portion and a second flexible mounting portion each extending from opposite ends of a flexible central portion; a first mounting member embedded in the first mounting portion; and a second mounting member embedded in the second mounting portion; wherein the first mounting portion and first mounting member comprise a first passage to enable the flexible bridge assembly to be secured to the first lens using a first fastener, and the second mounting portion and second mounting member comprise a second passage to enable the flexible bridge assembly to be secured to the second lens using a second fastener; and first and second nose pieces extending from or coupled to the flexible bridge assembly.

BRIEF DESCRIPTION OF THE DRAWINGS

Embodiments will now be described with reference to the appended drawings wherein.

DETAILED DESCRIPTION

To provide flexibility in eyewear, particularly rimless eyeglasses, a flexible bridge assembly can be provided in which rigid mounting members are contained or embedded in a flexible body that includes a flexible central portion that allows flexibility about the bridge of the eyewear.

Figure 1:
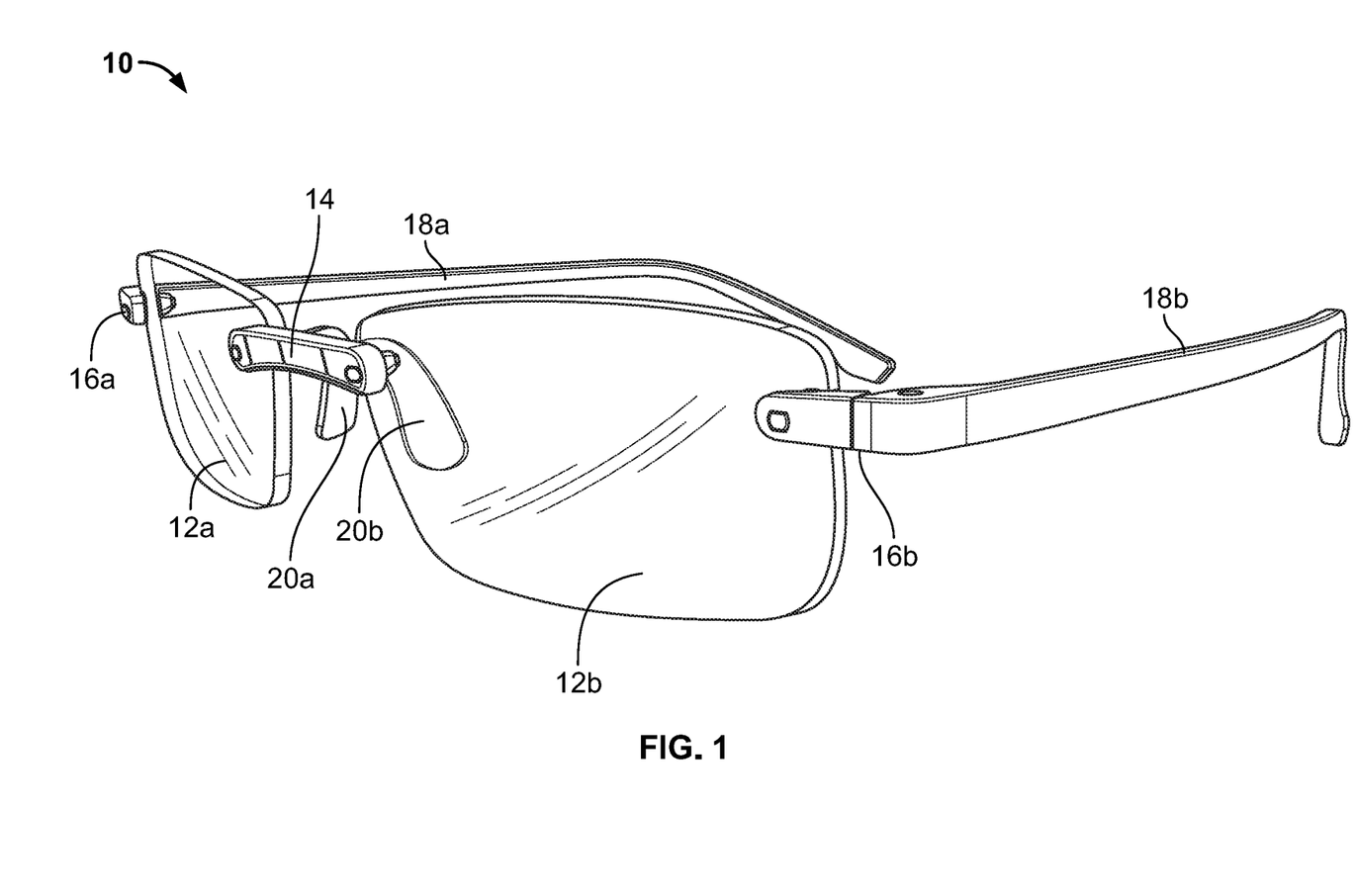
FIG. 1 is a perspective view of rimless eyewear with a flexible bridge assembly.

Turning now to the figures, FIG. 1 provides a perspective view of an assembled rimless eyewear 10, also referred to interchangeably herein as an rimless eyewear assembly 10 or rimless eyewear 10 or eyewear 10 for brevity. The rimless eyewear 10 includes a pair of lenses 12, in this example a first lens 12a and a second lens 12b. The lenses 12a, 12b are supported in a "rimless" configuration and thus frame components are attached directly to the lenses 12a, 12b rather than encircling and retaining them. The lenses 12a, 12b are connected to each other via a flexible bridge assembly 14 that includes or otherwise supports first and second nose pieces 20a, 20b. A first arm 18a is connected directly to the first lens 12a via a first arm mounting component 16a, and second arm 18b is connected directly to the second lens 12b via a second arm mounting component 16b. The first and second arm mounting components 16a, 16b can include hinges to permit the arms 18a, 18b to be folded relative to the lenses 12a, 12b as is known in the art.

Figures 2, 3:
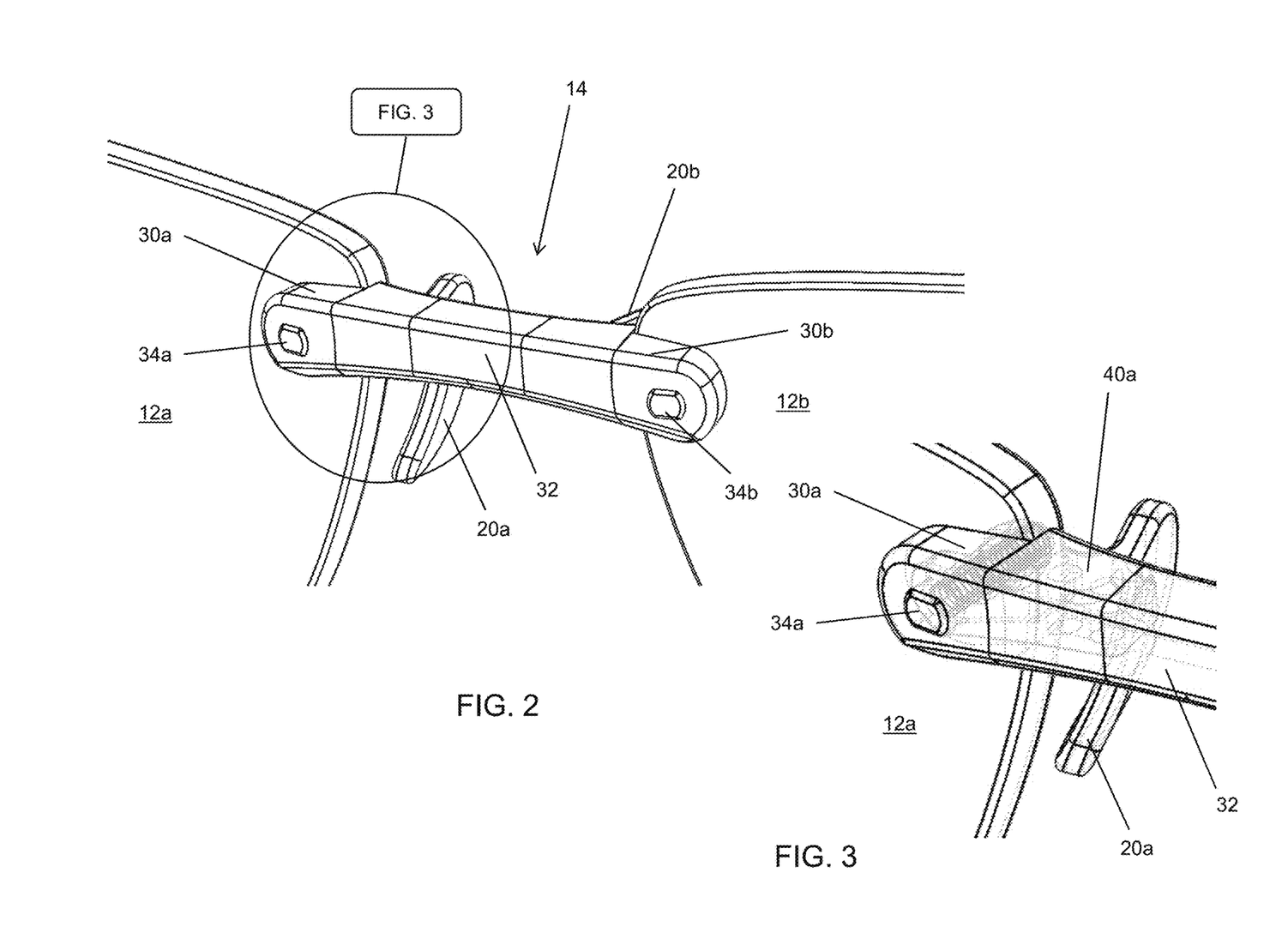
FIG. 2 is an enlarged partial perspective view of the flexible bridge assembly shown in FIG. 1.
FIG. 3 is an enlarged partial perspective view of a portion of the flexible bridge assembly shown in FIG. 2.

Additional details of the flexible bridge assembly 14 are apparent from FIGS. 2 and 3. In FIG. 2 it can be observed that the flexible bridge assembly 14 is connected to the lenses 12 via a pair of fasteners 34, which can be a screw, bolt, post, rivet, etc. In this example, a first fastener 34a is used to connect a first mounting portion 30a of the flexible bridge assembly 14 to the first lens 12a, and a second fastener 34b is used to connect a second mounting portion 30b of the flexible bridge assembly 14 to the second lens 12b. The mounting portions 30a, 30b are integral with a flexible central portion 32 of the flexible bridge assembly 14, which provides a desired separation between the lenses 12a, 12b when assembled as shown in FIG. 2. The flexible material comprising the flexible first and second mounting portions 30a, 30b extending from either end of the flexible central portion 32 may also be referred to herein as a flexible body or body generally, or collectively the "flexible material".

In FIG. 3, the transparency illustrates that the first nose piece 20a in this example is an extension of a first mounting member 40a that is embedded or otherwise included within the first mounting portion 30a of the flexible bridge assembly 14. While not shown in FIG. 3 (but shown in FIG. 4), it can be appreciated that in this example, the second nose piece 20b is an extension of a second mounting member 40b that is embedded or otherwise included within the second mounting portion 30b of the flexible bridge assembly 14. As will be explained in greater detail below, the mounting members 40 are made from a rigid material to provide stability and support for the eyewear 10 when the flexible bridge assembly 14 is attached to the lenses 12a, 12b. The other material that forms the first and second mounting portions 30a, 30b and the flexible central portion 32 are preferably overmolded on the mounting members 40a, 40b to create the assembly 14 that can then be assembled with the lenses 12a, 12b in constructing the eyewear.

The construction of the flexible bridge assembly 14 can be done using any suitable overmolding process. Overmolding, sometimes referred to as two times injection molding, is a process where a single part is created using two or more different materials in combination. Typically, the first material (or substrate) is partially or fully covered by overmolded material during the manufacturing process. In this case, the rigid mounting members 40a, 40b would act as the substrate that is overmolded with the material used to create the flexible mounting portions 30a, 30b and central portion 32 thereon, which is generally a softer plastic, rubber, or elastomer (e.g., PTE), or other suitable material. It can be appreciated that the flexible material would typically be overmolded to the rigid mounting members 40a, 40b, prior to attaching the flexible bridge assembly 14 to the lenses 12a, 12b. That is, the flexible bridge assembly 14 is preferably constructed as a separate component that is incorporated into the assembly process.

Figure 4:
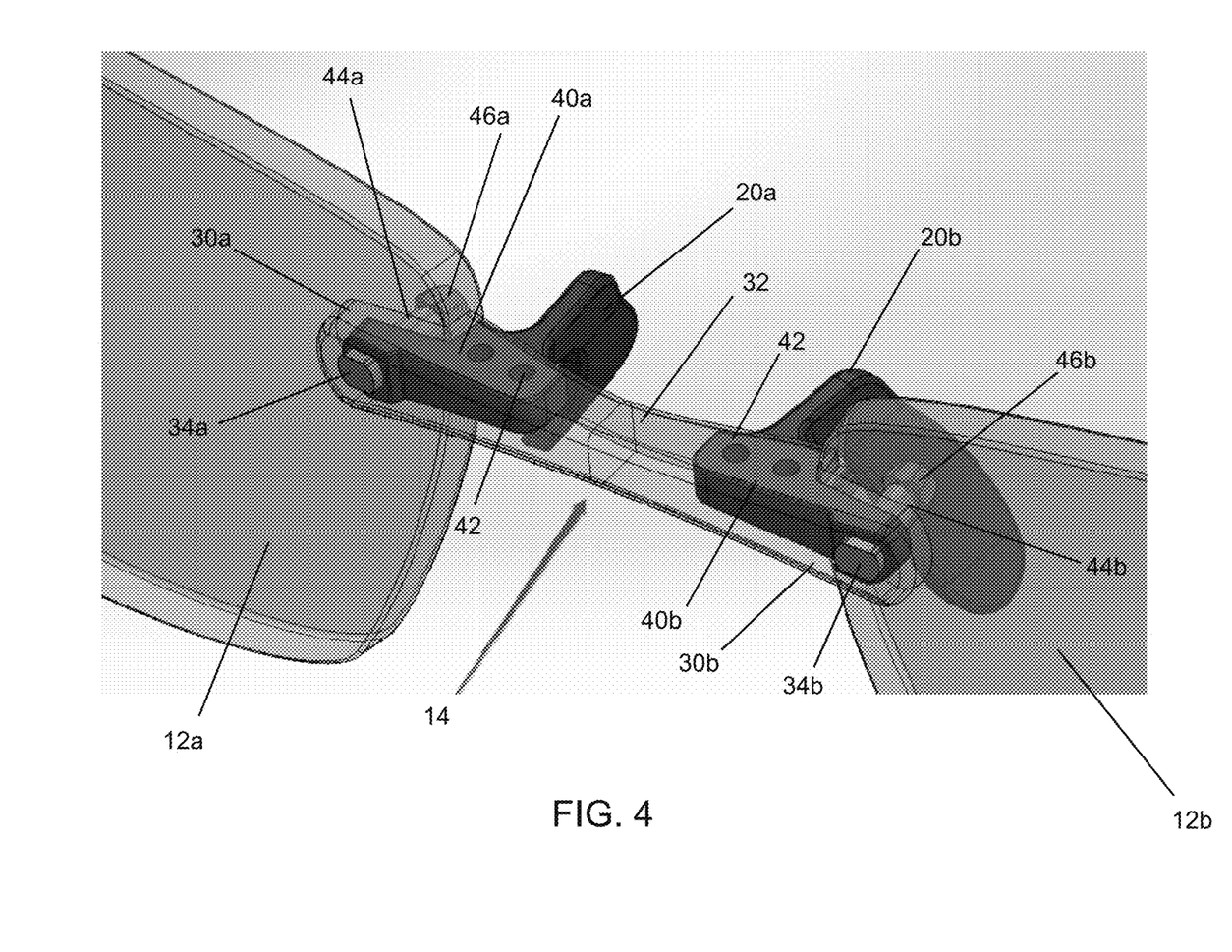
FIG. 4 is a partial perspective view of the flexible bridge assembly, with transparency used to illustrate interior components.

FIG. 4 illustrates further detail of the mounting hardware used in this example. The first fastener 34a in this example is embodied as a bolt having an unthreaded shaft 44a that includes a portion of threading that receives a first nut 46a on the rear side of the first lens 12a. Similarly, the second fastener 34b has an unthreaded shaft 44a that includes a portion of threading that receives a second nut 46b on the rear side of the second lens 12b.

Figure 5:
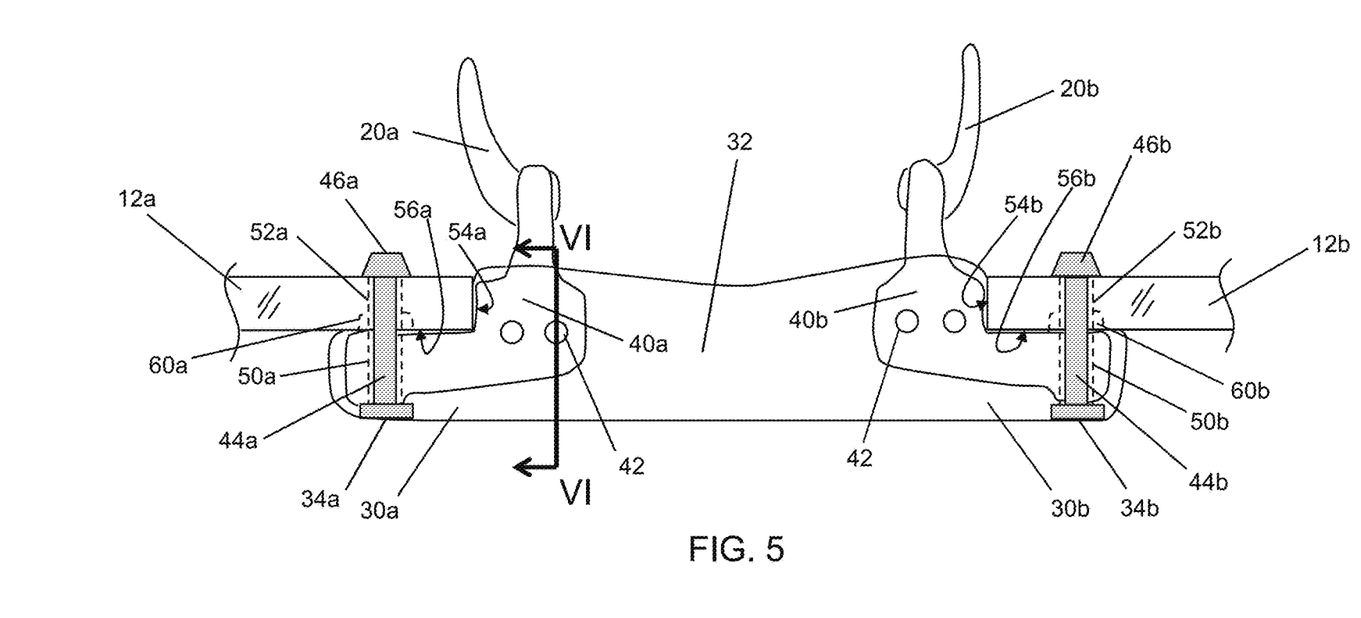
FIG. 5 is a plan view of the flexible bridge assembly shown in FIG. 4, with transparency used to illustrate interior components.

Turning now to the plan view shown in FIG. 5, it can be observed that the mounting members 40a, 40b are preferably overmolded or otherwise incorporated into the flexible bridge assembly 14 such that they provide rigid surfaces that bear against faces and edges of the lenses 12a, 12b. Specifically, the first mounting member 40a includes a first edge bearing surface 54a that seats with and engages an inner edge portion of the first lens 12a, and a first face bearing surface 56a that seats with and engages an outwardly facing portion of the front face of the first lens 12a. This effectively provides a notch or recess in the flexible bridge assembly 14 for the first lens 12a. Similarly, the second mounting member 40b includes a second edge bearing surface 54b that seats with and engages an inner edge portion of the second lens 12b, and a second face bearing surface 56b that seats with and engages an outwardly facing portion of the front face of the second lens 12b. This provides a notch or recess in the flexible bridge assembly 14 for the second lens 12b.

The "notches" provided in the flexible bridge assembly 14 also serve to align a first mounting passage 50a with a first lens passage 52a for inserting the first fastener 34a for securing the flexible bridge assembly 14 to the first lens 12a. Similarly, this allows a second mounting passage 50b to be aligned with a second lens passage 52b for inserting the second fastener 34b for securing the flexible bridge assembly 14 to the second lens 12b. It can be appreciated that the overmolded material can be configured to allow the heads of the first and second fasteners 34a, 34b to be at least partially countersunk as illustrated in FIG. 5. Similarly, the amount of overmolded material can be varied to suit different styles and aesthetics.

Figure 6:
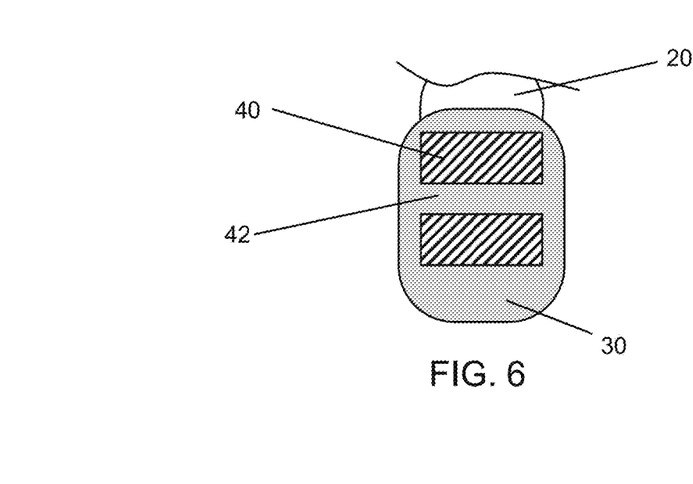
FIG. 6 is a cross-sectional view of the flexible bridge assembly shown in FIG. 5 along line VI-VI.

It can also be observed from FIG. 5 that the mounting members 40a, 40b can be provided with one or more holes 42 for the overmolding process. This is further illustrated in the cross-sectional view in FIG. 6 wherein the overmolded material of the mounting portion 30 flows through the hole 42 during the overmolding process and fills this hole 42 when cured to provide additional gripping and encapsulation of the mounting member 40. It can be appreciated that two holes 42 are shown in FIG. 5 for illustrative purposes only and any one or more holes can be used.

Figure 7:
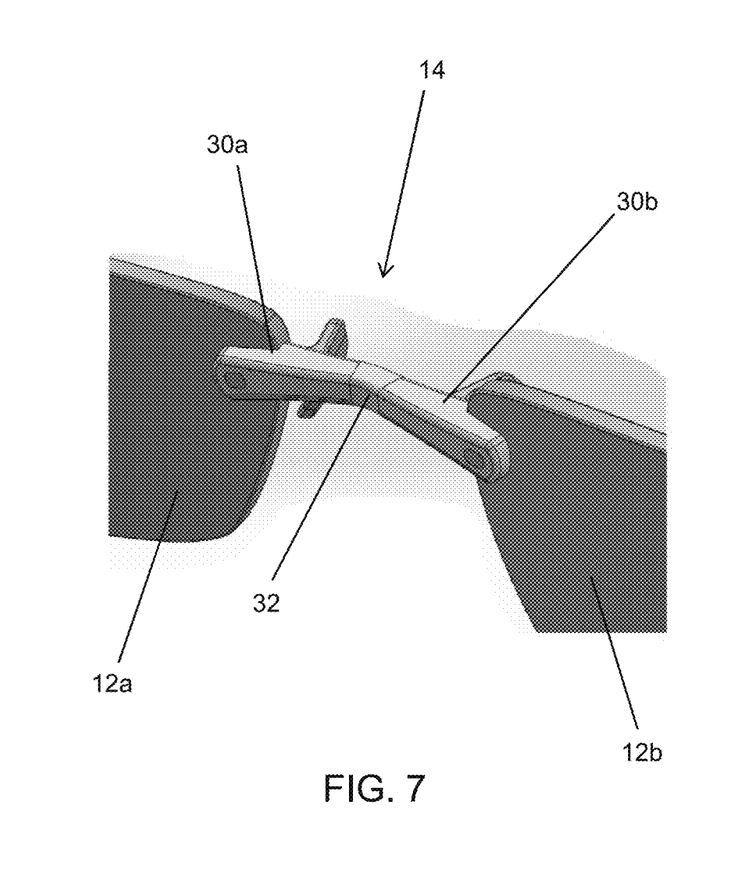
FIG. 7 is a partial perspective view illustrating flexure of the flexible bridge assembly in one direction.
Figure 8:
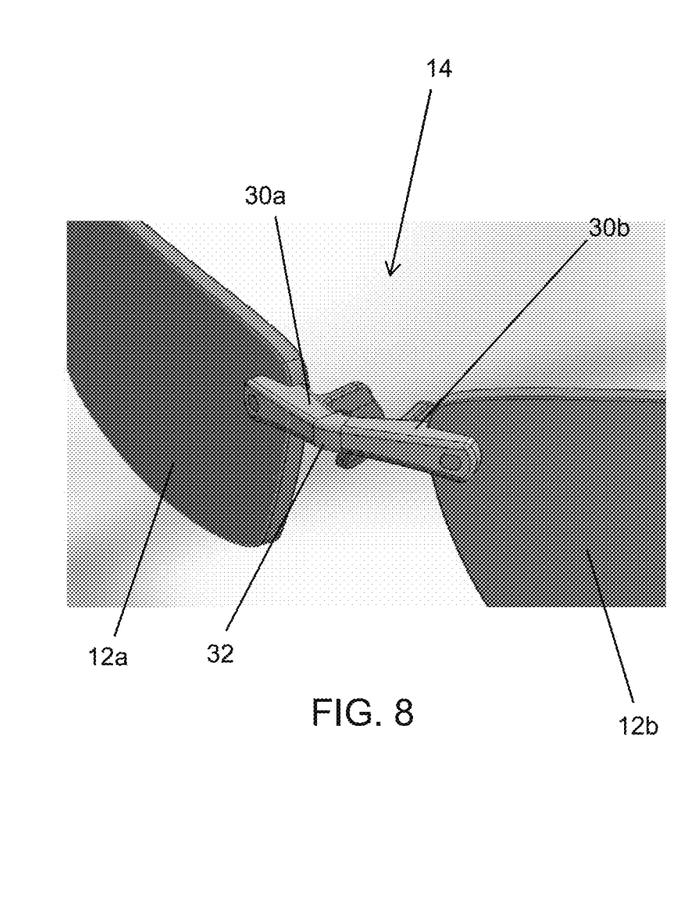
FIG. 8 is a partial perspective view illustrating flexure of the flexible bridge assembly in another direction.

The softer and flexible overmolded material that extends from the mounting portions 30a, 30b and through the central portion 32 creates a flexible bridge. The flexible central portion 32 enables the eyewear 10 to be flexed such that the rigid lenses 12a, 12b and arms 18a, 18b attached thereto can be bent or otherwise separated or twisted relative to each other. This allows, for example, a user to slightly flex the arms 18a, 18b away from each other when placing the eyewear 10 on their head, with resiliency in the flexible central portion 32 causing the arms 18a, 18b to return towards each other and seat against the user's head and on their ears. This flexibility also resists breakage of the rigid components by permitting them to flex, twist and to a certain extent fold, e.g., if the eyewear 10 falls, is sat-upon by the user, is stuffed into a purse or bag, etc. This flexibility is illustrated in FIGS. 7 and 8 in which FIG. 7 shows flexure of the central portion 32 allowing the arms 18a, 18b to be further separated. FIG. 8 shows flexure of the central portion 32 in the other direction, allowing the lenses 12a, 12b and arms 18a, 18b to be compressed towards each other without damaging the eyewear 10.

Figure 9:
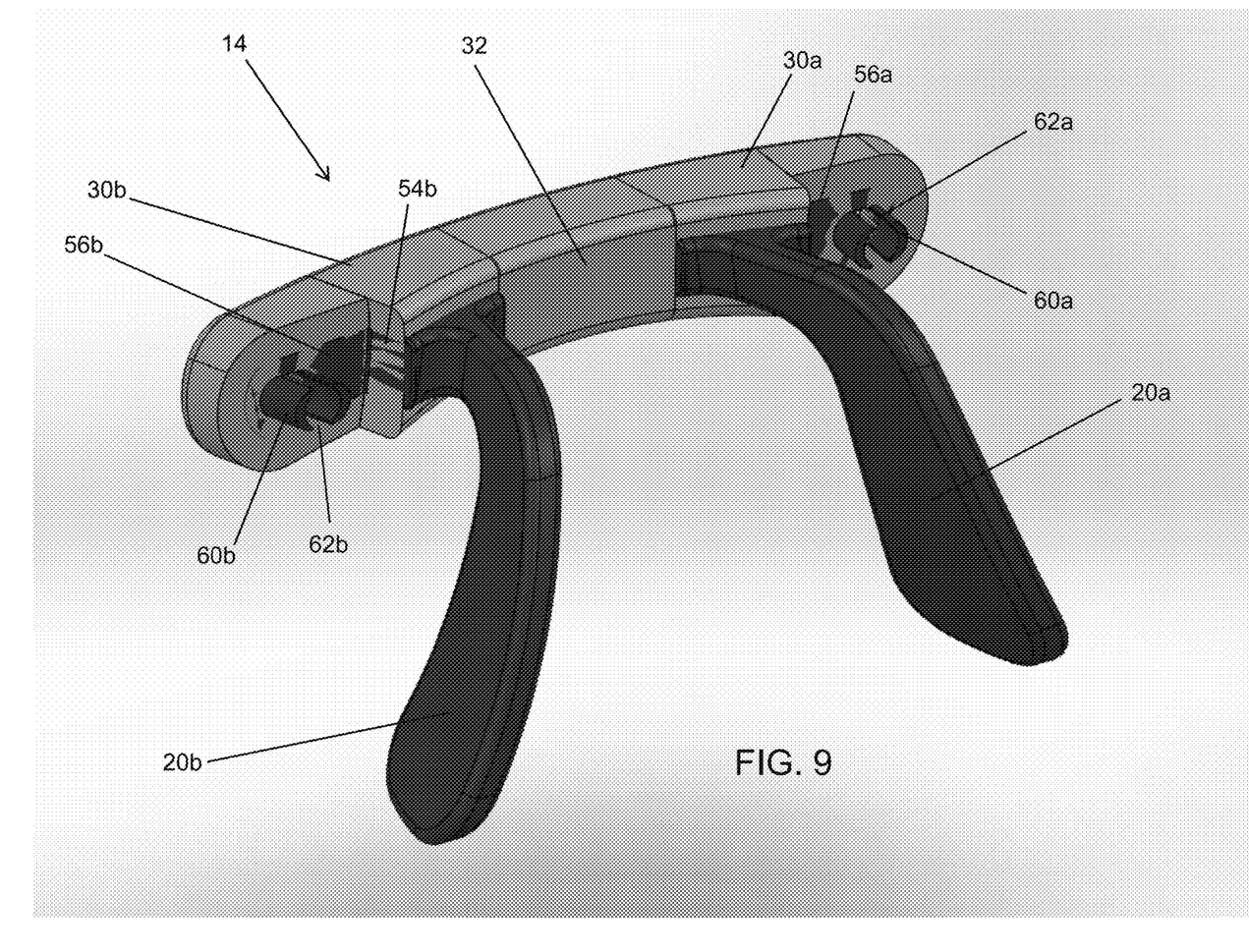
FIG. 9 is a perspective view of the flexible bridge assembly in isolation.

The flexible bridge assembly 14 is shown in isolation in FIG. 9, from the rear view. In this view, it can be seen that the amount of overmolded material in the notched areas of the first and second mounting portions 30a, 30b is minimal or none to provide relatively rigid surfaces 54, 56 to engage the lenses 12. The nose pieces 20a, 20b are integral with the mounting members 40a, 40b in this example and extend from the overmolded material. However, it can be appreciated that the nose pieces 20a, 20b could instead be constructed separately and coupled to the flexible bridge assembly 14 using other means. For example, posts (not shown) could be included which extend from the overmolded material and provide mounting areas for separate nose pieces (also not shown). In either configuration, the nose pieces 20a, 20b can be made from a flexible or deformable material that provides adjustability, and if applicable, can provide mounting areas for nose pads (not shown).

Also shown in FIG. 9 are first and second alignment tabs 60a, 60b that also extend from the overmolded material and conform to the shape of at least a portion of the first and second lens passages 52a, 52b. Referring also to FIG. 9, the tabs 60a, 60b can be sized to extend into a slot or countersunk portion of the passages 52a, 52b. These tabs 60a, 60b can include slots 62a, 62b that provide some resiliency to have the flexible bridge assembly 14 "snap" into the lens passages 52a, 52b. The tabs 60a, 60b (and slot or countersunk passage in lenses 12a, 12b) can also be oblong in shape, rather than circular, to inhibit rotation of the lenses 12a, 12b about the tabs 60a, 60b.

Figures 10, 11:
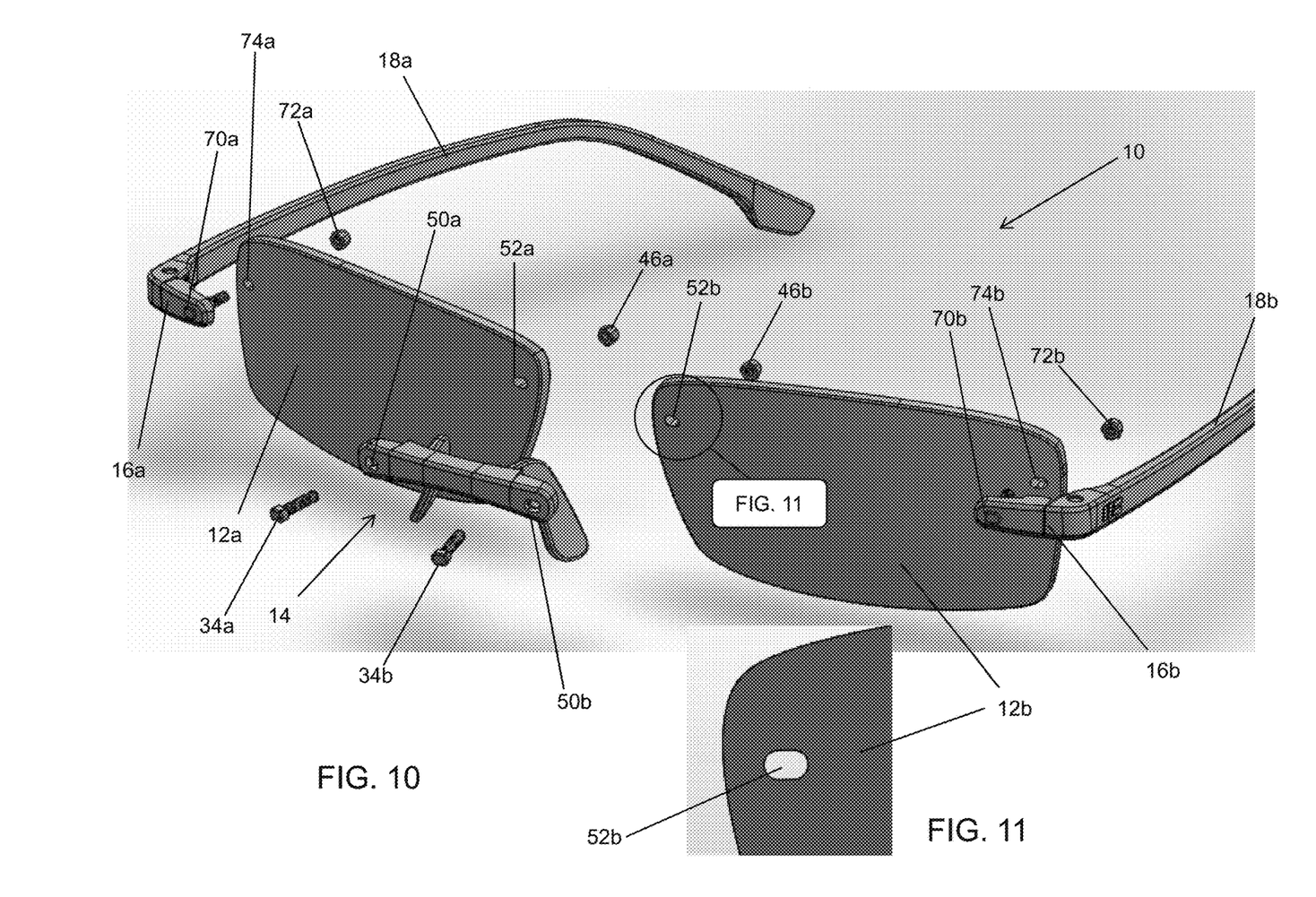
FIG. 10 is an exploded perspective view of the rimless eyewear shown in FIG. 1.
FIG. 11 is an enlarged front view of a portion of a lens shown in FIG. 10.

The exploded view in FIG. 10 illustrates the various components that are assembled to construct the eyewear 10. The fasteners 34a, 34b are inserted through the flexible bridge assembly 14 and the respective lens passages 52a, 52b and secured with the first and second nuts 46a, 46b. As indicated above, the oblong shape of the tabs 60a, 60b and corresponding shape of the passages 52a, 52b serves to align the lenses 12a, 12b relative to the flexible bridge assembly 14. Also shown in FIG. 10 is a first arm fastener 70a that is fed through a first arm mounting passage 74a at the outer end of the first lens 12a that is secured with a third nut 72a to assemble the first arm 18a. Similarly, a second arm fastener 70b is fed through a second arm mounting passage 74b at the outer end of the second lens 12b that is secured with a fourth nut 72b to assemble the second arm 18b. FIG. 11 provides an enlarged view of the second lens passage 52b to illustrate the corresponding shape of that passage 52b to accommodate insertion of the second tab 60b and to inhibit rotation and thus align the second lens 12b with the flexible bridge assembly 14. The other lens passages 52a, 74a, 74b can be similarly shaped for the same purpose.

While the foregoing discusses the use of overmolding as a preferred method of incorporating the rigid mounting members 40a, 40b in and with the flexible bridge assembly 14, it can be appreciated that other methods could instead be used. For example, the flexible mounting portions 30a, 30b could include a slot or cavity that is sized to receive the rigid mounting members 40a, 40b in the way illustrated in FIG. 5. In this example, the rigid mounting members 40a, 40b could be bonded to the flexible material to construct the flexible bridge assembly 14. This can be done prior to, or subsequent to mounting the mounting members 40a, 40b on the lenses 12a, 12b.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

Although the above principles have been described with reference to certain specific examples, various modifications thereof will be apparent to those skilled in the art as outlined in the appended claims.

The invention claimed is:

1. A flexible bridge assembly for eyewear comprising:
 a flexible body comprising a first mounting portion and a second mounting portion each extending from opposite ends of a flexible central portion;
 a first rigid mounting member embedded in the first mounting portion primarily in a lengthwise direction of the flexible bridge assembly; and
 a second rigid mounting member embedded in the second mounting portion primarily in a lengthwise direction of the flexible bridge assembly;
 wherein at least a portion of the flexible central portion does not have either the first rigid mounting member or the second rigid mounting member embedded therein and the first rigid mounting member and the second rigid mounting member do not extend into the flexible central portion;
 wherein the first mounting portion and first mounting member are configured to enable the flexible bridge assembly to be rigidly secured to a first lens of the eyewear, and the second mounting portion and second mounting member are configured to enable the flexible bridge assembly to be rigidly secured to a second lens of the eyewear; and
 wherein the flexibility of the central portion of the flexible body enables the bridge assembly to be flexed such that the first and second lenses being rigidly connected to the first and second rigid mounting members can be resiliently flexed relative to each other.

2. The assembly of claim 1, wherein the flexible body is overmolded over the first and second mounting members.

3. The assembly of claim 2, wherein the first and second mounting members each comprise at least one hole for receiving material applied in overmolding the flexible body.

4. The assembly of claim 1, further comprising first and second nose pieces.

5. The assembly of claim 4, wherein the first nose piece is integral with the first rigid mounting member and the second nose piece is integral with the second rigid mounting member, the nose pieces extending from the first and second mounting portions of the flexible body.

6. The assembly of claim 4, wherein the first and second nose pieces are adjustable.

7. The assembly of claim 1, wherein the first and second mounting portions of the body are countersunk to accommodate fasteners for securing the flexible bridge assembly to the lenses.

8. The assembly of claim 1, wherein the first and second rigid mounting members each comprise a tab surrounding first and second passages therethrough, the tabs for inserting into portions of passages in the lenses.

9. The assembly of claim 8, wherein the tabs comprise slits to provide resiliency during insertion.

10. The assembly of claim 8, wherein the tabs comprise an oblong shape that corresponds to an oblong shape of the portion of the passages in the lenses.

11. The assembly of claim 1, wherein the first and second mounting portions of the flexible body are configured to provide notches aligned with surfaces of the first and second rigid mounting members to engage with edges and faces of the lenses.

12. Rimless eyewear comprising:
first and second lenses;
first and second arm mounting components coupled to a first end of a respective one of the first and second lenses;
first and second arms coupled to the first and second arm mounting components; a flexible bridge assembly coupled to the first and second lenses, the flexible bridge assembly comprising:
a flexible body comprising a first mounting portion and a second mounting portion each extending from opposite ends of a flexible central portion;
a first rigid-mounting member embedded in the first mounting portion primarily in a lengthwise direction of the flexible bridge assembly; and a
second rigid mounting member embedded in the second mounting portion primarily in a lengthwise direction of the flexible bridge assembly;
wherein at least a portion of the flexible central portion does not have either the first rigid mounting member or the second rigid mounting member embedded therein and the first rigid mounting member and the second rigid mounting member do not extend into the flexible central portion;
wherein the first mounting portion and first mounting member are configured to enable the flexible bridge assembly to be rigidly secured to the first lens using a first fastener, and the second mounting portion and second mounting member are configured to enable the flexible bridge assembly to be rigidly secured to the second lens using a second fastener; and
first and second nose pieces extending from or coupled to the flexible bridge assembly;
wherein the flexibility of the central portion of the flexible body enables the bridge assembly to be flexed such that the first and second lenses being rigidly connected to the first and second rigid mounting members can be resiliently flexed relative to each other.

13. The eyewear of claim 12, wherein the flexible body is overmolded over the first and second mounting members.

14. The eyewear of claim 13, wherein the first and second mounting members each comprise at least one hole for receiving material applied in overmolding the flexible body.

15. The eyewear of claim 12, wherein the first nose piece is integral with the first rigid mounting member and the second nose piece is integral with the second rigid mounting member, the nose pieces extending from the first and second mounting portions of the flexible body.

16. The eyewear of claim 12, wherein the first and second nose pieces are adjustable.

17. The eyewear of claim 12, wherein the first and second mounting portions of the body are countersunk to accommodate fasteners for securing the flexible bridge assembly to the lenses.

18. The eyewear of claim 12, wherein the first lens and the second lens each comprise a passage within each lens and wherein the first and second rigid mounting members each comprise a tab surrounding the first and second passages, the tabs for inserting into portions of the passages in the lenses.

19. The eyewear of claim 18, wherein the tabs comprise slits to provide resiliency during insertion.

20. The eyewear of claim 18, wherein the tabs comprise an oblong shape that corresponds to an oblong shape of the portions of the passages in the lenses.

21. The eyewear of claim 12, wherein the first and second mounting portions of the flexible body are configured to provide notches aligned with surfaces of the first and second rigid mounting members to engage with edges and faces of the lenses.

22. The eyewear of claim 13, wherein the flexible body is overmolded over the first and second rigid mounting members prior to coupling the flexible bridge assembly to the first and second lenses.

23. The eyewear of claim 13, wherein the flexible body is overmolded over the first and second rigid mounting members subsequent to coupling the first and second rigid mounting members to the first and second lenses.

* * * * *